US007157126B2

(12) United States Patent
Cosentino et al.

(10) Patent No.: US 7,157,126 B2
(45) Date of Patent: *Jan. 2, 2007

(54) TEAR RESISTANT BAG FOR CONSUMABLES

(75) Inventors: Steven R. Cosentino, Quinton, VA (US); Stephen K. Franzyshen, Richmond, VA (US); Wesley K. Seiverd, Chesterfield, VA (US)

(73) Assignee: DuPont Teijin Films U.S. Limited Partnership, Wilmington, DE (US)

( * ) Notice: Subject to any disclaimer, the term of this patent is extended or adjusted under 35 U.S.C. 154(b) by 163 days.

This patent is subject to a terminal disclaimer.

(21) Appl. No.: 10/820,549

(22) Filed: Apr. 8, 2004

(65) Prior Publication Data

US 2004/0191438 A1    Sep. 30, 2004

Related U.S. Application Data

(63) Continuation-in-part of application No. 10/300,352, filed on Nov. 20, 2002.

(51) Int. Cl.
*B27N 1/00* (2006.01)
*A47G 19/22* (2006.01)

(52) U.S. Cl. .................. 428/34.3; 428/34.2; 428/34.6; 428/34.7; 442/395

(58) Field of Classification Search ............... 428/34.3, 428/34.2, 34.6, 34.7, 35.2, 35.9, 34.5, 478.8, 428/903.3; 442/394, 395
See application file for complete search history.

(56) References Cited

U.S. PATENT DOCUMENTS

| 3,309,260 A | 3/1967 | Boese |
| 3,908,650 A | 9/1975 | Dunshee et al. |
| 4,087,577 A | 5/1978 | Hendrickson |
| 4,106,261 A | 8/1978 | Greenawalt |
| 4,269,322 A | 5/1981 | Larson |
| 4,340,558 A | 7/1982 | Hendrickson |
| 4,507,351 A | 3/1985 | Johnson et al. |
| 5,147,698 A | 9/1992 | Cole |
| 5,173,357 A | 12/1992 | Nakane et al. |
| 5,494,745 A * | 2/1996 | Vander Velden et al. ... 428/354 |
| 5,503,907 A | 4/1996 | Gessner et al. |
| 5,536,556 A * | 7/1996 | Juriga ........................ 428/138 |
| 5,665,300 A | 9/1997 | Brignola et al. |
| 5,750,151 A | 5/1998 | Brignola et al. |
| 5,826,985 A | 10/1998 | Goodman et al. |
| 6,191,057 B1 | 2/2001 | Patel et al. |
| 6,242,371 B1 | 6/2001 | Quinones |
| 6,287,658 B1 | 9/2001 | Cosentino et al. |
| 6,335,479 B1 | 1/2002 | Yamada et al. |
| 6,357,504 B1 | 3/2002 | Patel et al. |
| 6,420,046 B1 | 7/2002 | Shah et al. |
| 6,534,137 B1 | 3/2003 | Vadhar |

(Continued)

OTHER PUBLICATIONS http://www.h-b.com/page18.htm. #Fiberweb® Thru-Wall Flashing.

(Continued)

*Primary Examiner*—Terrel Morris
*Assistant Examiner*—Lynda M. Salvatore
(74) *Attorney, Agent, or Firm*—RatnerPrestia (57) ABSTRACT

The invention is a tear-resistant container or bag made with a multilayer film comprising a composite structure of relatively inexpensive polymers and paper. The multilayer composite structure generally consists of an oriented polymer film layer adhered to a reinforcing scrim layer via a thermal bonding layer, to form a backing structure, and at least one paper layer adhered to the backing structure.

15 Claims, 3 Drawing Sheets

U.S. PATENT DOCUMENTS

| | | |
|---|---|---|
| 6,548,431 B1 | 4/2003 | Bansal et al. |
| 2003/0003249 A1 | 1/2003 | Benim et al. |
| 2004/0097157 A1* | 5/2004 | Cosentino .................. 442/394 |
| 2004/0132363 A1* | 7/2004 | Cosentino et al. ............ 442/16 |
| 2004/0151929 A1* | 8/2004 | Cosentino et al. ....... 428/479.6 |

OTHER PUBLICATIONS http://supremeinsulation.com/products/fiber/fiber_supp.htm. Fiber Glass Metal Building Insulation 202-96.

3M 44 electrical Tape Data Sheet.

* cited by examiner

TEAR RESISTANT BAG FOR CONSUMABLES

CROSS REFERENCE TO RELATED APPLICATIONS

This application is a Continuation in Part of U.S. patent application Ser. No. 10/300,352, filed Nov. 20, 2002, the contents of which are incorporated in their entirety herein by reference.

FIELD OF THE INVENTION

This invention relates to containers and particularly to a tear resistant bag comprising a recyclable multilayer structure.

BACKGROUND OF THE INVENTION

For some time various products have been packaged in large bag shaped packages which comprise paper alone or paper in combination with a thermoplastic film. Such bags are formed using a multilayer material that typically includes a plurality of paper layers, with a relatively thin, flexible plastic film adhered to the inside paper layer, the film serving as a moisture and grease barrier. Typically more than one layer of paper is used, including an outer layer that provides the package with an exterior surface which is highly printable, and an inner layer that provides stiffness to the bag such that it can be self-supporting. These basic characteristics generally provide the package with an overall aesthetic quality that consumers perceive as being desirable. Such paper packaging has been used in a variety of applications, particularly large bags which are used in the bulk packaging of dry granular material such as pet food, livestock feed, sugar, coffee, cookies, cereals, baking products such as cake mixes, crackers, chips, powdered milk, charcoal, cement, fertilizer, lime, pesticides, etc. While the term "large" is difficult to define precisely, as used within this description it refers to bags for carrying 5–10 lbs of material, and often more, such as in the case of bags for pet food or fertilizer. Clearly, because of the significant weight involved, such large bags are highly vulnerable to tearing.

A number of improvements to the bag construction materials have been tried. One example is that of a bag made of an all plastic film laminate. Bags made of all plastic laminates have not, however, been very successful. All plastic laminates, while generally stronger on a pound per pound basis when compared with paper, result in a product i) with an outer surface that tends to be slippery, presenting stacking problems; ii) that has poor self standing characteristics unless made with at least one fairly thick layer; and iii) having an exterior surface that is often difficult to print on. Also, such plastic laminate bags tend to be more costly because their manufacture requires replacement of bag making machinery that are tooled for producing multi-wall kraft bags.

In response, composite laminates of both paper and plastic film were developed and are now the structure of choice for large bags intended to contain granular or small particle material such as pet foods. The material of choice for such composite laminates appears to be a laminated structure having an internal multilayer coextruded plastic film grease barrier layer glued to a first strength providing inner paper layer which in turn is glued to a second outer paper layer having desired printability and consumer appeal. Additionally, a composite of film reinforced with a scrim film has also been proposed as a bag material, as disclosed in U.S. Pat. No. 4,340,558 issued to Hendrickson on July 20.

Composites of paper and film, while they remain the material of choice in the manufacture of large size bags for granular consumables, pet foods, fertilizer and the like, where printability, water impermeability, self standing and the ability to stand to abuse properties are important, do unfortunately present cost problems. Specifically, due to severe cost reduction pressures being experienced by the industry, there remains a continuing need to provide such bags that are inexpensive to manufacture without loss of the desirable properties of the currently preferred plastic/paper composites.

One way to effectuate cost reduction is to reduce the manufacturing cost of any of the materials used in the bag fabrication. Part of the material costs can be traced to the actual fabrication process, and such cost includes production efficiencies and minimization of waste material. It is therefore desirable to develop a bag using materials that are cost effective to produce.

SUMMARY OF THE INVENTION

The present invention is directed to a bag made with a multilayer film comprising a composite structure of relatively inexpensive polymers and paper.

According to the present invention there is, therefore, provided a container, preferably bag shaped, that exhibits self standing properties and resistance to puncture and tearing through the use of a tear resistant multilayer structure that comprises:

I. a multilayer plastic film structure consisting essentially of:

a) an oriented polymer film layer having a top surface and a inner surface;

b) a thermal bonding polymer layer on the oriented polymer layer inner surface substantially coextensive thereto, the thermal bonding polymer layer having a thickness between 10% and 40% of a combined thickness of the oriented polymer film layer and the thermal bonding polymer layer; and c) a reinforcing scrim polymer layer also having an inner surface adjacent and substantially coextensive with the thermal bonding polymer layer; and II. at least one paper layer adhered to said multilayer plastic film structure, and wherein the polymer film layer and the bonding polymer layer are co-extruded layers having a chemical composition that permits recycling without separating the layers. Preferably the scrim as well has a similar chemical composition, permitting recycling following lamination. Such selection of materials permits the recovery of waste material during production runs by the simple recycling of the complete laminated structure.

Recycling as used in this invention means the ability to reuse the material in the same or similar process. Ability to be used means that the recycled material can be used in proportions of a 20–70% by weight in the product using the recycled material. For example, waste polyester production run material may be shredded and then reused in for example, a pelletizing extruder, such as is well known in the art, to make recycled pellets. The recycled polyester pellets can be mixed with fresh or virgin polyester polymer, and the mixture re-melted and re-extruded to produce an oriented film or other product.

Still in accordance with the present invention, the thermal bonding polymer layer, and the reinforcing scrim polymer layer each individually comprise a synthetic condensation polymer. The synthetic condensation polymers each comprises, in polymerized form:

(a) a carboxylic acid or a mixture of carboxylic acids, and
b) either i) a diamine or a mixture of diamines, or ii) a diol or a mixture of diols, or (b) an ω-amino acid having more than 2 carbon atoms, or a mixture of such amino acids. For the structure taken as a whole, (1) at least 90 mol % of a combined total amount of the carboxylic acid or the mixture of carboxylic acids in the synthetic condensation polymers is the same carboxylic acid, (2) at least 90 mol % of a combined total amount of the diamine or the mixture of diamines in the synthetic condensation polymers is the same diamine, (3) at least 90 mol % of a combined total amount of the diols or the mixture of diols in the synthetic condensation polymers is the same diol, and (4) at least 90 mol % of a combined total amount of the amino acid or the mixture of amino acids in the synthetic condensation polymers is the same amino acid.

The oriented polymer film layer may be biaxially oriented polyethylene terephthalate.

DETAILED DESCRIPTION OF THE INVENTION

The invention will next be described with reference to the figures wherein same numbers indicate same features. The figures are provided for illustration and explanation of this invention and are, therefore not drawn to scale nor are they intended as engineering drawings for use in a manufacturing process. Thus certain elements are exaggerated while elements not needed to understand this invention are not shown or shown in part only.

Figure 1:
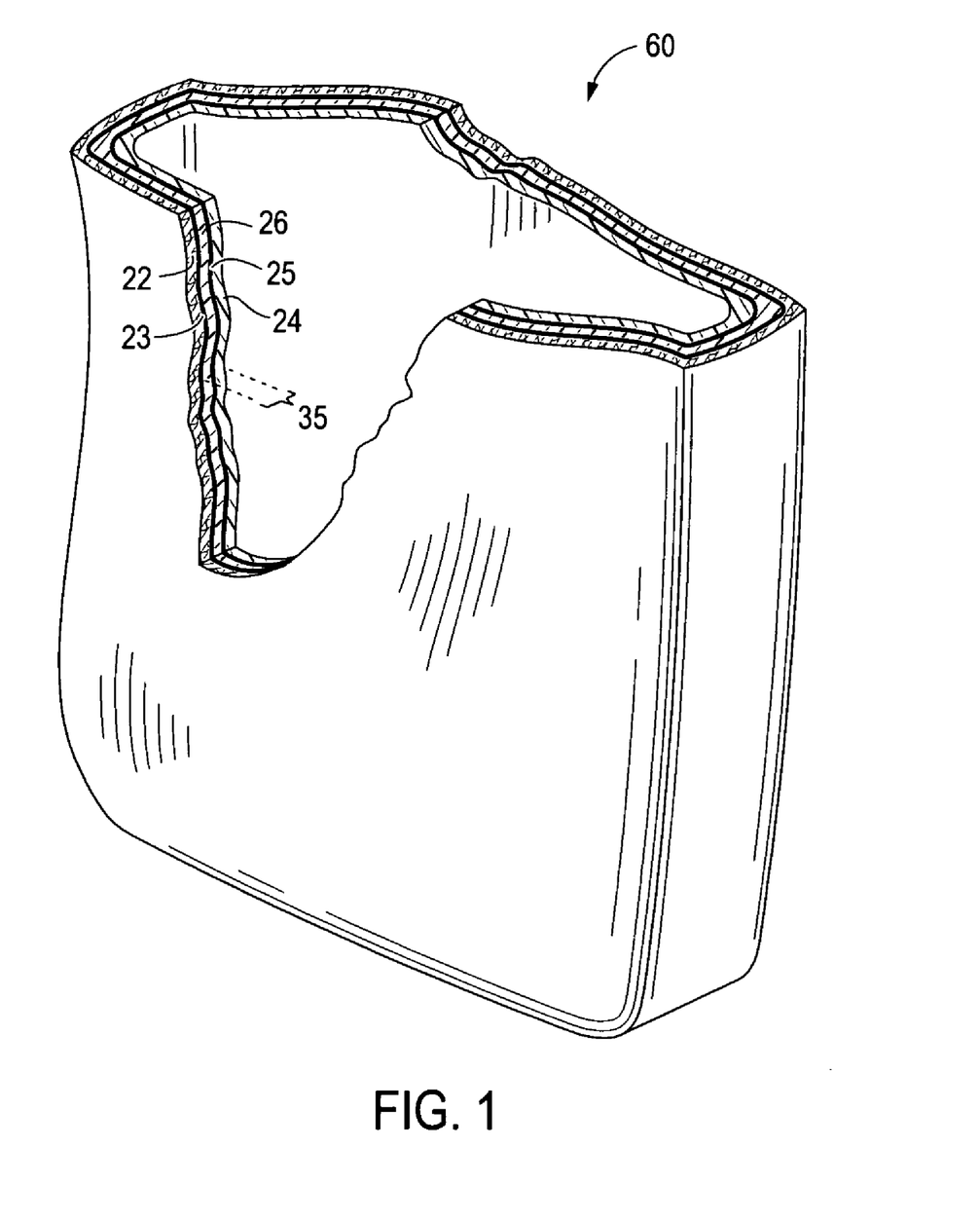
FIG. 1 shows a bag comprising a multilayer sheet material incorporating a tear resistant composite layer in accordance with this invention.
Figure 3:
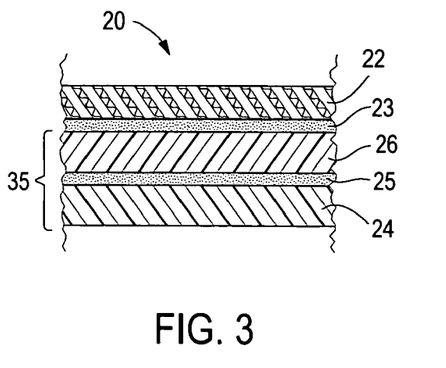
FIG. 3 shows in schematic cross sectional representation a multilayer sheet material structure used to form a large bag according to this invention.

Referring next to FIG. 1 there is illustrated a basic embodiment of a large bag 60 according to the invention. The exterior surface of the bag 60 comprises a paper layer 22 adhered to a reinforcing backing structure 35. The backing structure 35 is a multilayer assembly preferably consisting of an oriented polymer film layer 24, a thermal bonding polymer layer 25 adjacent and substantially coextensive thereto, and a reinforcing scrim polymer layer 26 adjacent and substantially coextensive with the thermal bonding polymer layer 25. The exterior paper layer 22 is adhered to the scrim layer 26 through an adhesive layer 23. In this embodiment, the oriented polymer film layer 24 provides the interior surface of the bag 60. FIG. 3 discussed below, shows in cross section the structure of the sheet material used in forming bag 60.

While the embodiment of the composite sheet material set forth in FIG. 3 is used in this bag embodiment illustration, the inventors contemplate the use of a plurality of different composite sheet materials, all comprising the reinforcing tear resistant backing structure 35 for use in forming a heavy duty bag according to the present invention. Therefore, multiple other embodiments of the composite sheet material of the invention are described designed to address a variety of factors relating to the final use of the large bag. A "large bag" was defined earlier to mean a bag large enough to carry 5 lbs–10 lbs or more of material. Therefore, some factors that may need to be considered in determining an effective sheet material structure for such large bag include i) requirements for the exterior surface of the bag; ii) weight of the material; iii) structure of the material; iv) moisture inside and outside of the bag; v) odor resistance; vi) grease resistance; vii) flexibility of the bag; vii) opacity of the bag; viii) infestation resistance; and ix) various other factors that may affect the materials contained within the bag, as well as the environment associated with various storage and transport conditions.

Figure 2:
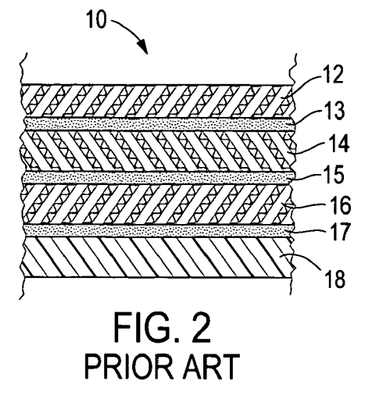
FIG. 2 shows in schematic cross sectional representation a typical multilayer sheet material currently used to form a large bag for granular materials.

According to the prior art the most commonly used sheet material for heavy duty bags is shown in FIG. 2. As shown, the sheet material 10 comprises an outer layer of 41 lb kraft clay coated paper layer 12 typically containing printed matter on its outer surface. On its inner surface the paper layer 12 is coated with a an adhesive layer 13, such as tack glue. A second 50 lb kraft paper layer 14 is next adhered to paper layer 12 with adhesive layer 13. To this second kraft paper layer 14 there is adhered, again using a tack glue adhesive layer 15 a third paper layer 16, again typically a 50 lb kraft paper. Alternatively, adhesive layers 13 & 15 may be applied only at the edges of the bag. To the paper multilayer structure there is adhered an extruded resin film 18, such as 1–2 mil (25.4–50.8 µm) thick, low density polyethylene (LDPE) or high density polyethylene (HDPE) through a third adhesive layer 17. The layer 18 provides a grease barrier between the contents of the bag and the outer surface of the bag.

The sheet material structure shown in FIG. 1 is shown in better detail in schematic cross section in FIG. 3 where there is shown a cross sectional view of a composite sheet material structure, indicated generally as 20. Composite structure 20 comprises reinforcing backing structure 35 adhered to paper layer 22 through an adhesive layer 23

The reinforcing backing layer 35 is a multilayer assembly preferably consisting of an oriented polymer film layer 24, a thermal bonding polymer layer 25 adjacent and substantially coextensive thereto, and a reinforcing scrim polymer layer 26 adjacent and substantially coextensive with the thermal bonding polymer layer. The thermal bonding polymer layer 25 has a thickness between 10% and 40% of the combined thickness of thermal bonding polymer layer 25 and oriented polymer film layer 24. The combined thickness of the polymer film layer 24 and the thermal bonding layer 25 should be no less than approximately 5 µm preferably no less than 12 µm. Similarly the combined thickness of the two layers 24 and 25 could be as high as 130 μm. A more preferred range of thickness of the polymer film layer 24 and the thermal bonding layer 25 is between approximately 10 microns and 40 microns.

In a preferred embodiment, the oriented polymer film layer 24, the thermal bonding layer 25, and the reinforcing scrim polymer layer 26, are selected to be of sufficiently similar chemical composition so that the entire backing structure 35 may be recycled without first separating the layers thereof. Specifically, these materials are selected such that it is possible to recover waste material during production runs by the simple recycling of the entire backing structure 35, without having to separate layers 24–26. The term "recycling" as used in this invention means reuse of the material in the same or a similar process. "Recyclable" means that the recycled material is suitable for use in proportions of 20–70% by weight in the product using the recycled material.

For example, scraps of polyester-based backing material, including trim waste, unusable rolls, etc. can be shredded and then processed in a pelletizing extruder, such as is well known in the art, to make recycled polyester pellets. Such recycled polyester pellets can be mixed with fresh or virgin polyester polymer, and the mixture re-melted and re-extruded to produce an oriented film, thermal bonding layer, scrim, or other product. The backing structures used for making the composite tear resistant bags of the present invention offer a recycling advantage over backing structures made by coating or extruding lamination processes using materials that are not all chemically similar, in which situations the recycled polyester pellets (and products made from them) often tend to degrade and discolor to an unacceptable degree.

In one group of embodiments of the invention providing a recyclable backing structure 35, the oriented polymer film layer 24, the thermal bonding polymer layer 25, and the reinforcing scrim polymer layer 26 each individually comprise a synthetic condensation polymer. Each of these comprises, in polymerized form:

1) a) a carboxylic acid or a mixture of carboxylic acids, and b) either i) a diamine or a mixture of diamines, or ii) a diol or a mixture of diols, or 2) an ω-amino acid having more than 2 carbon atoms, or a mixture of such amino acids.

In this embodiment, the compositions of the layers are such that, for the backing structure taken as a whole, the following requirements are met.

1) At least 90 mol % of a combined total amount of the carboxylic acid or the mixture of carboxylic acids in the synthetic condensation polymers is the same carboxylic acid.

2) At least 90 mol % of a combined total amount of the diamine or the mixture of diamines in the synthetic condensation polymers is the same diamine.

3) At least 90 mol % of a combined total amount of the diols or the mixture of diols in the synthetic condensation polymers is the same diol.

4) At least 90 mol % of a combined total amount of the amino acid or the mixture of amino acids in the synthetic condensation polymers is the same amino acid.

Condensation polymers exemplifying embodiments of the invention according to these requirements may include polyamides comprising, in polymerized form, diacids and diamines, for example nylon 10,12; nylon 6,12; nylon 6,10; and nylon 6,6. These examples each include only a single diacid and a single diamine, but mixtures may be used, as long as mol % requirements 1) through 4) set forth above are met. Suitable condensation polymers may also comprise, in polymerized form, an amino acid such as 6-aminohexanoic acid.

In a preferred embodiment of the invention, the condensation polymers are polyesters, such as have been described above, again provided that the backing structure comprising them meets mol % requirements 1) through 4) set forth above. Particularly preferred are polyesters in which at least the majority of the diacid on a molar basis is terephthalic acid, and at least the majority of the diol on a molar basis is ethylene glycol.

In one embodiment, each of the layers of the backing structure 35 is essentially 100% polyester resin, all of similar intrinsic viscosity, without significant amounts of other components such as surfactants, plasticizers, tackifiers, crosslinking agents, low molecular weight components, non-polyester resins, or other constituents that might adversely affect recycle polymer quality.

Oriented polymer film layer 24, which may be monoaxially oriented or biaxially oriented, may be produced from a linear polyester. Typically the linear polyester will have an intrinsic viscosity from about 0.5 to about 0.8, with about 0.6 being most typical. Preferred polyester films are biaxially oriented polyethylene terephthalate (PET) film and biaxially oriented polyethylene naphthalate (PEN) film.

Especially useful is polyethylene terephthalate that has been biaxially oriented and heatset. Such a material is well known in the art, and is described for example in U.S. Pat. No. 4,375,494 to Stokes.

Polyethylene terephthalate polymer preparation techniques are well known to those skilled in the art and are disclosed in many texts, such as Encyclopedia of Polymer Science and Engineering, 2nd. Ed., Vol. 12, Wiley, N.Y., pp. 1–313. The polymer is typically obtained by condensing the appropriate dicarboxylic acid or its lower alkyl diester with ethylene glycol. Polyethylene terephthalate is formed from terephthalic acid or an ester thereof, and polyethylene naphthalate is formed from 2,7-naphthalene dicarboxylic acid or an ester thereof.

Oriented polymer film layer 24 may also comprise a particulate additive, for example to improve the visual appearance of the product or to modify the permeability of the composite structure to water vapor or other gasses. One example of a film containing such a particulate additive is a biaxially oriented polyethylene terephthalate containing approximately 15% of titanium dioxide, commercially available from DuPont Teijin Films of Wilmington, Del. under the name Mylar® 365T, which also comprises pre-coated thereon thermal bonding layer 25. Other types and amounts of particulate additives such as for example clay, talc, and silica may also be used according to the invention.

Another suitable PET film comprising a pre-coated adhesive layer for use as layers 24 and 25 is Melinex® 389, which also contains a UV absorber which may provide improved stability of the composite structure for applications with printed graphics. This embodiment is particularly useful in the bag structure embodiment shown in FIG. 7 and described later in this document.

Oriented polymer film layer 24 may also include additives to reduce the flame spread of a composite tear resistant bag incorporating it. Incorporation of flame-retardant additives in oriented polymer film layer 24 may reduce the need for such additives to be included in any of the other layers used in the composite sheet material.

Thermal bonding polymer layer 25 is preferably capable of forming an adhesive bond to oriented polymer film layer 24 and to reinforcing scrim polymer layer 26, to be described shortly. Typically, thermal bonding polymer layer 25 is formed on a surface of oriented polymer film layer 24 to form a film composite. The composite is subsequently attached to reinforcing scrim polymer layer 26 by applying pressure and by heating to a temperature high enough to soften layer 25 but not high enough to soften or melt the oriented polymer film layer 24 or the reinforcing scrim polymer layer 26. While somewhat more expensive, alternatively a hot melt adhesive can be used to attach reinforcing scrim polymer layer 26 to oriented polymer film layer 24. In order for the backing structure 35 to be 'recyclable' in this embodiment, the hot melt should be the same IPA copolyester as layer 25.

In a preferred embodiment of the invention, thermal bonding polymer layer 25 may comprise a polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. A preferred copolyester is derived from terephthalic acid and one or both of isophthalic acid and hexahydroterephthalic acid, and one or more glycols, preferably ethylene glycol. Exemplary copolyesters that provide satisfactory bonding properties in the amorphous state are those of ethylene terephthalate and ethylene isophthalate, especially in the molar ratios 60 to 90 mol % ethylene terephthalate and correspondingly 40 to 10 mol % ethylene isophthalate. Particularly preferred copolyesters comprise 70 to 85 mol % ethylene terephthalate and 30 to 15 mol % ethylene isophthalate, for example a copolyester of approximately 82 mol % ethylene terephthalate and approximately 18 mol % ethylene isophthalate.

In manufacturing the sheet material according to the invention the backing structure 35 may be formed by solvent casting or extrusion of a thermal bonding polymer onto the surface of a self-supporting film of the oriented polymer film layer material, which is preferably a biaxially oriented and heat-set film of polyethylene terephthalate or polyethylene naphthalate.

In the case where oriented polymer film layer 24 is biaxially oriented polyethylene terephthalate and thermal bonding polymer layer 25 is a copolyester resin as described above, the film composite may be conveniently made by a process that includes multiple extrusion through a multiple orifice die or coextrusion of the composite layers, e.g. broadly as described in U.S. Pat. No. 3,871,947, followed by molecular orientation by stretching in one or more directions and heat setting. A convenient process and apparatus for coextrusion, known as single channel coextrusion, is described in U.S. Pat. No. 4,165,210. The method comprises simultaneously extruding streams of the first and second polyesters from two different extruders, uniting the two streams in a tube leading to a manifold of an extrusion die, and extruding the two polyesters together through the die under conditions of streamline flow so that the two polyesters occupy distinct regions of the flow without intermixing, whereby a film composite is produced.

Biaxial orientation of the polyethylene terephthalate oriented polymer film layer of the film composite may be accomplished by stretching the composite in sequence in two mutually perpendicular directions typically at temperatures in the range of about 78 to 125° C. Generally, the conditions applied for stretching the composite may function to partially crystallize the thermal bonding polymer layer 25, and in such cases it is preferred to heat set the film composite under dimensional restraint at a temperature greater than the crystalline melting temperature of the thermal bonding polymer layer 25, but lower than the crystalline melting temperature of the polyethylene terephthalate oriented polymer film layer 24. The composite is then permitted or caused to cool, rendering the thermal bonding polymer layer 25 essentially amorphous while high crystallinity is maintained in the oriented polymer film layer 24. Therefore, the stretching operation is preferably followed by heat setting under dimensional restraint, typically at a temperature in the range 150 to 250° C. Convenient processes for stretching and heat setting are described in U.S. Pat. No. 3,107,139.

One exemplary coextruded film composite of the type described above incorporates a biaxially oriented PET polymer film layer 24 and a thermal bonding polymer layer 25 comprising a terephthalate/isophthalate copolyester of ethylene glycol, commercially available from DuPont Teijin Films of Wilmington, Del. under the name Melinex® 301H.

Suitable non-limiting examples of materials for making reinforcing scrim polymer layer 26 are woven or nonwoven materials comprising polyester fibers. Many such materials are known in the art, and are referred to generically as "scrim". A preferred non-woven scrim, is a spun-bonded copolyester product comprising major and minor proportions of terephthalic acid and isophthalic acid polymerized with one or more diols and having a basis weight of about 18 g/m² and a thickness of 0.0038 inches, available from BBA Filtration (division of BBA Nonwovens, Nashville, Tenn.) under the name StarWeb® 2253C. Other suitable scrims from the same manufacturer include Starweb® grades T503 (34 g/m2) and 2817 (51 g/m2), Reemay® 2004 spun-bonded polyester, with a basis weight of about 14 g/m² and Reemay® 2006 and 2250. Nonwoven scrims suitable for use in this invention have a basis weight typically in the range of about 4 to about 100 g/m², preferably from about 10 to about 30 g/m², and more preferably from about 10 to about 20 g/m².

Woven scrims (bi or tri-dimensional) may also be used, especially when a high level of tensile and/or tear strength is desired, and these may vary in basis weight from about 15 to about 300 g/m². They may be made from any of a variety of polyesters, including but not limited to polyethylene terephthalate and polyethylene naphthalate.

Bonding of the reinforcing scrim polymer layer 26 to layer 24 on the side having thermal bonding layer 25, may be achieved by applying heat and pressure to cause thermal bonding layer 25 to soften and adhere to scrim polymer layer 26. Suitable equipment for performing such bonding is well known in the art, and includes, inter alia, a Model TT Laboratory Coater/Laminator manufactured by Faustel Corp. of Germantown, Wis. and flatbed type laminators such as the Powerbond™ laminator manufactured by Reliant Machinery Ltd, Chesham ENGLAND.

As shown in FIG. 3 a paper layer 22 is adhered to the reinforcing backing layer 35 using an adhesive layer 23. Paper layer 22 is preferably clay coated 41 lb craft paper, a material that exhibits good printability and maintains the outer appearance of the bag unchanged from the appearance that has become commercially acceptable for similar products.

Adhesive layer 23 preferably comprises either hot melt or water based adhesives. Some examples of suitable adhesives include grade 33-4020 Polyvinyl Acetate water-based adhesive and grade 34-2635 EVA-based hot melt glue (National Starch & Chemical Company, Bridgewater N.J.). While no special laminating steps are required, it is preferred that the aqueous adhesive can be roller coated or sprayed, while the hot melt adhesive be applied either as a continuous layer or in a random or regular pattern such as dots, stripes, etc, as is known in the art. It is preferred that beads of hot melt adhesive be applied in rows as described in Example 1 below. In one embodiment of the invention, adhesive layer 23 comprises a copolyester, for example one such as described above in relation to thermal bonding layer 25.

While it is preferred that paper layer 22 is adhered to the scrim polymer layer 26 of the backing layer 35, either side of the backing layer 35 can be adhered to the paper layer 22. In the bag structure, however, it is generally preferred that the scrim polymer layer 26 not be in contact with the product inside the bag, while the outer surface usually contains printed information regarding the product in the bag.

Figure 4:
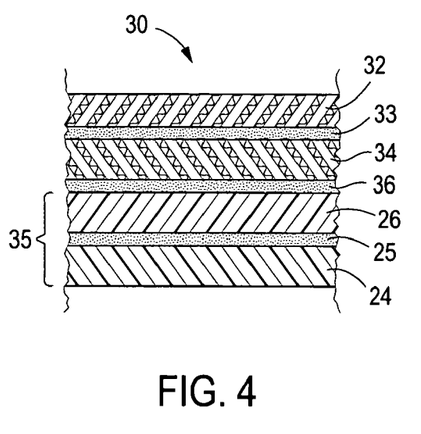
FIG. 4 shows in schematic cross sectional representation an alternate multilayer sheet material structure used to form a large bag according to this invention.

Several alternate embodiments of the multilayer sheet material structure are contemplated in this invention and shown in the figures. FIG. 4 illustrates another cross-sectional view of an embodiment of a composite sheet material structure for use in this invention, generally indicated as 30. In sheet material 30 the reinforcing backing layer 35 is adhered through an adhesive layer 36 to a composite paper layer structure comprising two distinct paper layers, an outer layer 32 of lighter paper material such as 41 lb clay coated kraft paper adhered through a tack glue layer 33 to an inner layer 34 of heavier paper material such as 50 lb kraft paper. Adhesive layer 33 generally can comprises any known adhesive as used in the industry for laminating paper-to-paper. Adhesive layer 36 preferably has the same composition as adhesive layer 23 described above. It is also preferred that, in forming a bag using this sheet structure, that the oriented polymer film layer 24 of the backing layer 35 serve as the interior layer of the bag.

Figure 5:
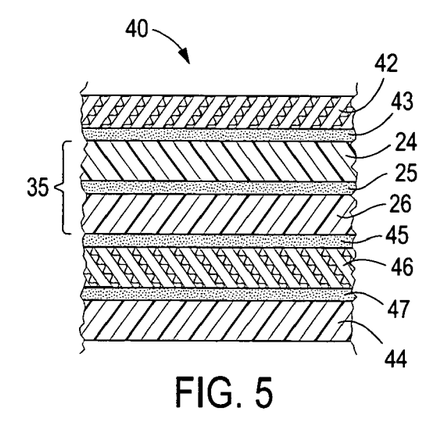
FIG. 5 shows in schematic cross sectional representation, another alternate multilayer sheet material structure used to form a large bag according to this invention.

FIG. 5 illustrates yet another cross sectional view of a composite sheet material, generally referred to as 40, wherein the reinforcing backing layer 35 is sandwiched between an outer paper layer 42 and an inner paper layer 46. The outer paper layer 42 generally comprises a lighter weight paper, for example 41 lb Kraft, while the inner paper layer 46 is preferably heavier weight such as 50 lb kraft paper. The outer paper layer 42 and the inner paper layer 46 are adhered to both sides of backing layer 35 by adhesive layers 43 and 45 respectively. In this embodiment, it is further preferred that an additional oriented polymer film layer 44 be adhered to the inner paper layer 46 using an adhesive layer 47. It is contemplated that, when using this sheet material to form a bag, the oriented polymer film layer 44 can serve as either the exterior layer or the interior layer of the bag depending on the nature of the material to be loaded in the bag.

Alternatively, layer 44 may be a paper layer rather than a polymer film layer, making it better suited for serving as the exterior layer of the bag.

Figure 6:
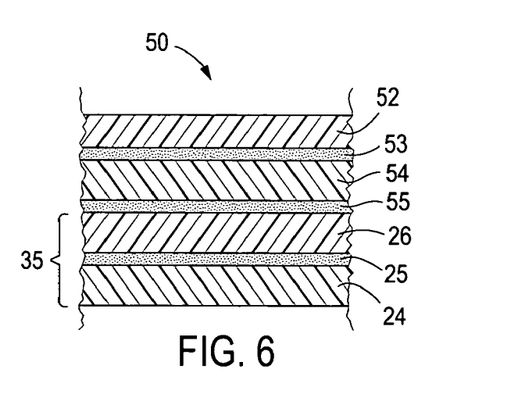
FIG. 6 shows in schematic cross sectional representation, an additional multilayer sheet material structure used to form a large bag according to this invention.

Another composite sheet material embodiment referred to generally as 50 is depicted in a cross section view in FIG. 6. In this embodiment, sheet material 50 has a composite structure comprising an oriented polymer film layer 52, such as, for example, a polyethylene or polypropylene, preferably biaxially oriented film layer, an adhesive layer 53 and a low density polyethylene (LDPE) film layer 54 adhered to tear resisting layer 35 via adhering layer 55. Preferably the LDPE film layer 54 and the oriented polymer film layer 52 are extrusion laminated in which case adhesive layer 53 is omitted. Furthermore the LDPE layer may itself act as an adhesive in which case adhesive layer 55 may also be eliminated and the co-extruded composite layers 52 and 54 may be laminated directly onto the tear resisting layer composite layer 35.

The benefits of using a low density polyethylene film layer 54 are that such layer: (1) adds opacity (by use of LDPE pigmented with TiO2 and the like); and (2) economically adds stiffness and bulk to the bag structure. Examples of suitable homopolymer polyethylene resins for extruding into films with higher stiffness include PE 1033 and PE 1024 manufactured by Huntsman Corp, Houston Tex. Copolymers can also be used.

Figure 7:
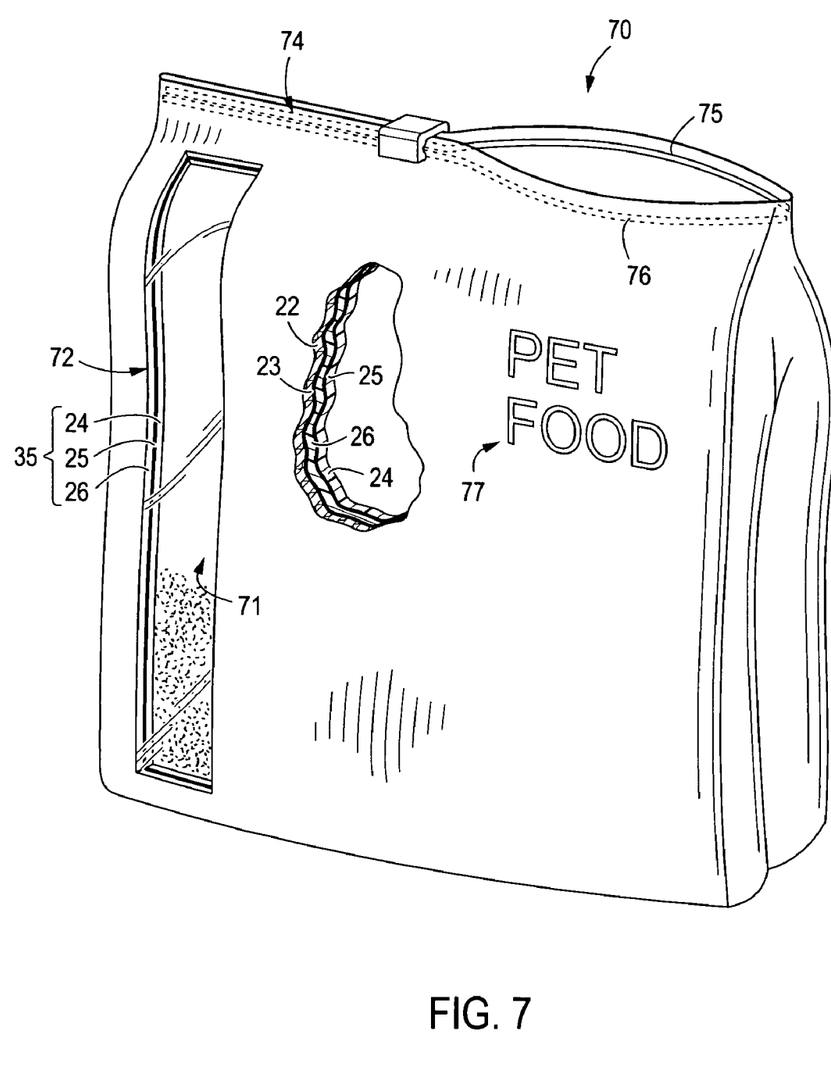
FIG. 7 shows another bag comprising a translucent multilayer sheet material in accordance with this invention and including a zippered closure.

FIG. 7 illustrates an alternate bag structure 70 illustrating a number of features incorporated therein in response to different uses contemplated for such structure. The features may not all be present in one bag. And while this bag is illustrated as using the composite sheet material detailed in FIG. 3, it is understood that any of the sheet material structures shown in FIGS. 3–6 may be used.

As shown in FIG. 7, the bag may include printed matter 77, and a translucent section 71 comprising a translucent multilayer sheet material 72. A translucent multilayer sheet material, as used in this invention, refers to a multilayer sheet material that, when incorporated into a bag, allows one to see the contents inside of the bag from outside of the bag at least with sufficient clarity to determine the amount of material remaining therein, and therefore includes fully transparent materials.

The bag may include such section in a portion of the bag forming a window into the bag contents, or may be fully translucent or transparent. A preferred embodiment of translucent multilayer sheet material 72 comprises a translucent embodiment of backing structure 35 and a translucent paper layer 22 combined in the structure shown in FIG. 3. The preferred materials comprising the assembly of backing structure 35 are an oriented polymer film layer 24, a thermal bonding polymer layer 25 and a reinforcing scrim layer 26, all of which can be, and generally are, made such that they are translucent, even when adhered to each other to form the backing structure 35. Those having skill in the art are familiar with the materials comprising layers 24, 25 and 26, and thus have the knowledge to construct a translucent backing structure 35. Layer 22 may be transparent or translucent paper such as glassine or wax paper.

In a preferred embodiment, the UV absorber technology referred to earlier in this document is used in the translucent multilayer sheet material to protect the product inside the bag from damage or fading from UV light.

The bag may also be designed to have an integral resealable closure means 74. Such means are well known in the art, generally comprising co-operating complementary embossed patterns 75 and 76 on the bag sides such that when brought together under some applied pressure the two patterns interlock to form a re-useable closure. Some examples of resealable closure means well known in the art include reclosable zipper-type closure, and any other structure comprising male and female interlocking profiles extending along opposing sides of an opening of the bag that are constructed to releasably interlock. While the resealable closure means 74 can be incorporated into the bag by any means known in the art, it is preferred that the resealable closure means 74 is molded into the multilayer sheet material of the bag 70.

Large bags formed using composite sheet material such as described in the foregoing disclosure have been found to provide a high level of both dry and wet tear strength resistance, and self standing characteristics when compared with paper alone or laminated to an oriented polymer film layer without scrim. Composite sheet material has the capability to be processed on existing multiwall bag manufacturing machinery. The making of composite sheet material structures using backing structures having good recyclability provides an economic advantage, relative to the use of backing structures not so constructed.

The invention can be better understood by reference to the following examples which are intended to illustrate, not limit, the present invention.

EXAMPLES

The composite material according to this invention was evaluated by comparing with composite materials of the prior art. The paper used was Kraft 60 lb brown paper. The non-woven scrims used in this example were Starweb® 2253C,. Starweb® 2253C is a polyester adhesive scrim composed of continuous filament spunbonded polyester and copolyester, available in 17 g/m² weight, denier per filament is 2.2 and thickness is 3.8 mils (96.52 μm), purchased from Reemay, Inc., Old Hickory, Tenn.

The oriented polymer film layer used in this example was Melinex® 301H 48 gauge or 80 gauge. Melinex® 301H was obtained from DuPont Teijin Films of Wilmington, Del.

The sample laminates were prepared by adhering the layers using beads of approximately 2 mm diameter of hot melt adhesive, applied in rows spaced two inches apart. The materials were then pressed together by hand press.

A number of samples were prepared having the following structures:

1. Two layers of Kraft paper glued together.
2. Kraft paper glued to Starweb 2253C Scrim layer glued to Kraft paper.
3. Kraft paper glued to Melinex 301H 48 gauge film glued to Kraft paper.
4. Kraft paper glued to Melinex 301H 80 gauge film glued to Kraft paper.
5. Kraft paper glued to Melinex 301H 48 Gauge thermally bonded to Starweb 2253C Scrim using a flatbed laminator at 300° F. and 25 fpm ("TR1") glued to Kraft.
6. Kraft paper glued to Melinex 301H 80 Gauge thermally bonded to Starweb 2253C Scrim using a flatbed laminator at 300° F. and 25 fpm. ("TR2") glued to Kraft Table 1 sets forth Elmendorf tear test data that was obtained for each of the above composite structures according to ASTM D1922. Machine Direction is designated by MD and Cross Direction is designated by CD.

TABLE 1

| Sample | Tear Strength (grams) | | Tear Strength (gm · cm/cm tear/thou.) | |
|---|---|---|---|---|
| | MD | CD | MD | CD |
| 1. Kraft/Kraft | 256.0 | 275.2 | 182.9 | 196.9 |
| 2. Kraft/2253C/Kraft | 444.8 | 515.2 | 234.1 | 271.2 |
| 3. Kraft/301H-48/Kraft | 294.4 | 291.2 | 203.0 | 200.8 |
| 4. Kraft/301H-80/Kraft | 310.4 | 304.0 | 209.7 | 205.4 |
| 5. Kraft/TR1/Kraft | 1532.8 | 1174.4 | 958.0 | 734.0 |
| 6. Kraft/TR2/Kraft | 1465.6 | 1235.2 | 814.2 | 686.2 |

The data show that all of the tested structures that include the tear resisting backing structure (co-extruded PET film and scrim) showed greater tear resistance than the control, (paper only sample 1), and also greater tear resistance than either scrim alone (sample 2), and film alone (sample 3 and 4). The particular embodiments of 5, and 6 showed the greatest tear resistance, and that there is a synergistic benefit in tear strength when utilizing PET film laminated with scrim that is more than expected from the individual materials.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A bag comprising a multilayer structure comprising:
   I. a multilayer tear resisting composite plastic film structure consisting essentially of:
      a) an oriented polymer film layer having a top surface and a inner surface;
      b) a thermal bonding polymer layer on the oriented polymer film layer inner surface substantially coextensive thereto, the thermal bonding polymer layer having a thickness between 10% and 40% of a combined thickness of the oriented polymer film layer and the thermal bonding polymer layer; and
      c) a reinforcing scrim polymer layer also having an inner surface adjacent and substantially coextensive with the thermal bonding polymer layer; and
   II. at least one additional layer adhered to said multilayer tear resisting composite plastic film structure;
   wherein said multilayer structure forms said bag; and
   wherein the oriented polymer film layer, the thermal bonding polymer layer, and the reinforcing scrim polymer layer all have a chemical composition that permits recycling said multilayer tear resisting composite plastic film structure without separating the layers thereof and each individually comprise a synthetic condensation polymer, the synthetic condensation polymers each comprising, in polymerized form:
   1) a) a carboxylic acid or a mixture of carboxylic acids, and b) either I) a diamine or a mixture of diamines, or II) a diol or a mixture of diols, or
   2) an ω-amino acid having more than 2 carbon atoms, or a mixture of such amino acids, wherein, for the composite structure taken as a whole, at least 90 mol % of a combined total amount of the carboxylic acid or the mixture of carboxylic acids in the synthetic condensation polymers is the same carboxylic acid,
at least 90 mol % of a combined total amount of the diamine or the mixture of diamines in the synthetic condensation polymers is the same diamine,
at least 90 mol % of a combined total amount of the diols or the mixture of dials in the synthetic condensation polymers is the same diol, and
at least 90 mol % of a combined total amount at the amino acid or the mixture or amino acids in the synthetic condensation polymers is the same amino acid.

2. The bag according to claim 1 wherein the combined thickness of said oriented polymer film layer and said thermal bonding polymer layer is between about 0.0002 inches and 0.003 inches.

3. The bag according to claim 2 wherein said at least one additional layer is a paper layer adhered to an outer surface of said reinforcing scrim polymer layer and comprises an exterior surface of said bag.

4. A bag comprising a multilayer structure comprising:
   I. a multilayer tear resisting composite plastic film structure consisting essentially of:
      a) an oriented polymer film layer having a top surface and a inner surface;
      b) a thermal bonding polymer layer on the oriented polymer film layer inner surface substantially coextensive thereto, the thermal bonding polymer layer having a thickness between 10% and 40% of a combined thickness of the oriented polymer film layer and the thermal bonding polymer layer; and c) a reinforcing scrim polymer layer also having an inner surface adjacent and substantially coextensive with the thermal bonding polymer layer; and II. at least one additional layer adhered to said multilayer tear resisting composite plastic film structure;

wherein the oriented polymer film layer, the thermal bonding polymer layer and the reinforcing scrim polymer layer all have a chemical composition that permits recycling said multilayer tear resisting composite plastic film structure without separating the layers thereof, wherein said multilayer structure forms said bag;

wherein the combined thickness of said oriented polymer film layer and said thermal bonding polymer layer is between about 0.0002 inches and 0.003 inches;

wherein said at least one additional layer is a paper layer adhered to an outer surface of said reinforcing scrim polymer layer and comprises an exterior surface of said bag; and wherein both said paper layer and said multilayer tear resisting composite structure are translucent in at least a portion of said bag.

5. A bag comprising a multilayer structure comprising:

I. a multilayer tear resisting composite plastic film structure consisting essentially of:

a) an oriented polymer film layer having a top surface and a inner surface;

b) a thermal bonding polymer layer on the oriented polymer film layer inner surface substantially coextensive thereto, the thermal bonding polymer layer having a thickness between 10% and 40% of a combined thickness of the oriented polymer film layer and the thermal bonding polymer layer; and c) a reinforcing scrim polymer layer also having an inner surface adjacent and substantially coextensive with the thermal bonding polymer layer; and II. at least one additional layer adhered to said multilayer tear resisting composite plastic film structure;

wherein the oriented polymer film layer, the thermal bonding polymer layer and the reinforcing scrim polymer layer all have a chemical composition that permits recycling said multilayer tear resisting composite plastic film structure without separating the layers thereof, wherein said multilayer structure forms said bag;

wherein the combined thickness of said oriented polymer film layer and said thermal bonding polymer layer is between about 0.0002 inches and 0.003 inches; and wherein said at least one additional layer comprises an inner and an outer paper layer adhered to each other, said inner paper layer being the layer also adhered to said multilayer tear resisting composite plastic film structure, said inner paper layer being heavier than said outer paper layer.

6. A bag comprising a multilayer structure comprising:

I. a multilayer tear resisting composite plastic film structure consisting essentially of:

a) an oriented polymer film layer having a top surface and a inner surface;

b) a thermal bonding polymer layer on the oriented polymer film layer inner surface substantially coextensive thereto, the thermal bonding polymer layer having a thickness between 10% and 40% of a combined thickness of the oriented polymer film layer and the thermal bonding polymer layer; and c) a reinforcing scrim polymer layer also having an inner surface adjacent and substantially coextensive with the thermal bonding polymer layer; and II. at least one additional layer adhered to said multilayer tear resisting composite plastic film structure;

wherein the oriented polymer film layer, the thermal bonding polymer layer and the reinforcing scrim polymer layer all have a chemical composition that permits recycling said multilayer tear resisting composite plastic film structure without separating the layers thereof, and wherein said multilayer structure forms said bag;

wherein the combined thickness of said oriented polymer film layer and said thermal bonding polymer layer is between about 0.0002 inches and 0.003 inches; and wherein said at least one additional layer comprises at least two paper layers adhered to said multilayer tear resisting composite structure, a first of said at least two paper layers adhered to said top surface of said multilayer tear resisting composite plastic film structure and a second of said at least two paper layers adhered to an outer surface of said reinforcing scrim polymer layer.

7. The bag according to claim 6 further comprising an additional plastic film layer adhered to said second of said at least two paper layers forming an innermost layer of said bag.

8. The bag according to claim 2 wherein said at least one additional layer comprises an auxiliary composite structure comprising a first film layer and a low density polyethylene layer adhered thereto.

9. The bag according to claim 8 wherein said low density polyethylene layer also serves as an adhesive to adhere said auxiliary composite structure to one or both of said first film layer and said multilayer tear resisting composite plastic film structure.

10. The bag according to claim 9 wherein said first film layer is a polyethylene film layer.

11. The bag according to claim 9 wherein said first film layer is a biaxially oriented polypropylene layer.

12. The bag according to claim 1, wherein the oriented polymer film layer comprises biaxially oriented polyethylene terephthalate.

13. A bag comprising a multilayer structure comprising:

I. a multilayer tear resisting composite plastic film structure consisting essentially of;

a) an oriented polymer film layer having a top surface and a inner surface;

b) a thermal bonding polymer layer on the oriented polymer film layer inner surface substantially coextensive thereto, the thermal bonding polymer layer having a thickness between 10% and 40% of a combined thickness of the oriented polymer film layer and the thermal bonding polymer layer; and c) a reinforcing scrim polymer layer also having an inner surface adjacent and substantially coextensive with the thermal bonding polymer layer; and II. at least one additional layer adhered to said multilayer tear resisting composite plastic film structure;

wherein the oriented polymer film layer, the thermal bonding polymer layer and the reinforcing scrim polymer layer all have a chemical composition that permits recycling said multilayer tear resisting composite plastic film structure without separating the layers thereof, wherein said multilayer structure forms said bag;

wherein the combined thickness of said oriented polymer film layer and said thermal bonding polymer layer is between about 0.0002 inches and 0.003 inches; and wherein said bag comprises an opening side and wherein said opening side further comprises a closure comprising a pattern molded on an inner surface of said multilayer structure.

14. The bag according to claim 13 wherein said molded pattern is part of a zipper closure.

15. The bag according to claim 2 wherein the oriented polymer film layer and the thermal bonding polymer layer are co-extruded layers.

* * * * *